United States Patent
Bram

[11] 3,765,706
[45] Oct. 16, 1973

[54] JOINT FOR TUBULAR ELEMENTS
[75] Inventor: Georges Eugene Bram, Pont-a-Mousson, France
[73] Assignee: Societe Des Fonderies De Pont-A-Mousson, Nancy, France
[22] Filed: June 4, 1971
[21] Appl. No.: 150,059

[30] Foreign Application Priority Data
June 16, 1970 France .............................. 7022036

[52] U.S. Cl. ................. 285/231, 285/356, 285/376, 285/382.7
[51] Int. Cl. ........................................... F16l 21/02
[58] Field of Search .................... 285/212, 231, 339, 285/356, 376, 382.7; 277/101, 102, 207 A

[56] References Cited
UNITED STATES PATENTS
2,138,135    11/1938    Boucher .......................... 285/356 X
3,092,404    6/1963    MacWilliam .................... 285/356 X FOREIGN PATENTS OR APPLICATIONS
963,304    12/1949    France .............................. 285/356
1,023,421    12/1952    France .............................. 285/352

Primary Examiner—Mervin Stein
Assistant Examiner—David H. Corbin
Attorney—J. Delattre-Seguy

[57] ABSTRACT

Joint between a pipe socket and a pipe male end. A sealing element is radially compressed between the male end and a rabbet in the socket. An annular transverse flange defines an inner transverse end face of the rabbet and has an opening for centering the male end. A retaining ring for the sealing element is fixed to the entrance portion of the socket and has a frustoconical inner portion which fills a frustoconical cavity in the socket between the entrance and the sealing element.

8 Claims, 6 Drawing Figures

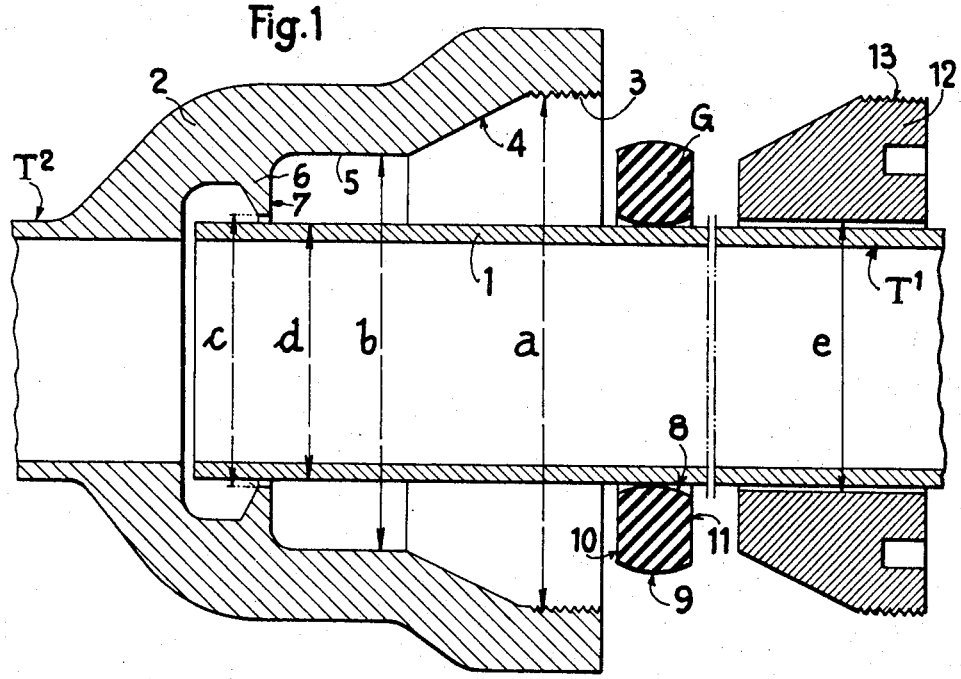
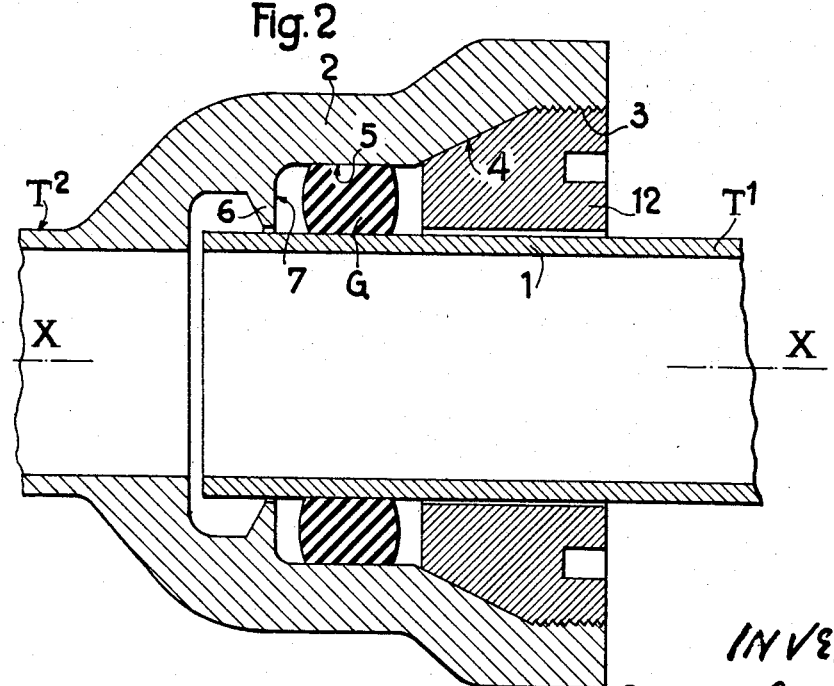

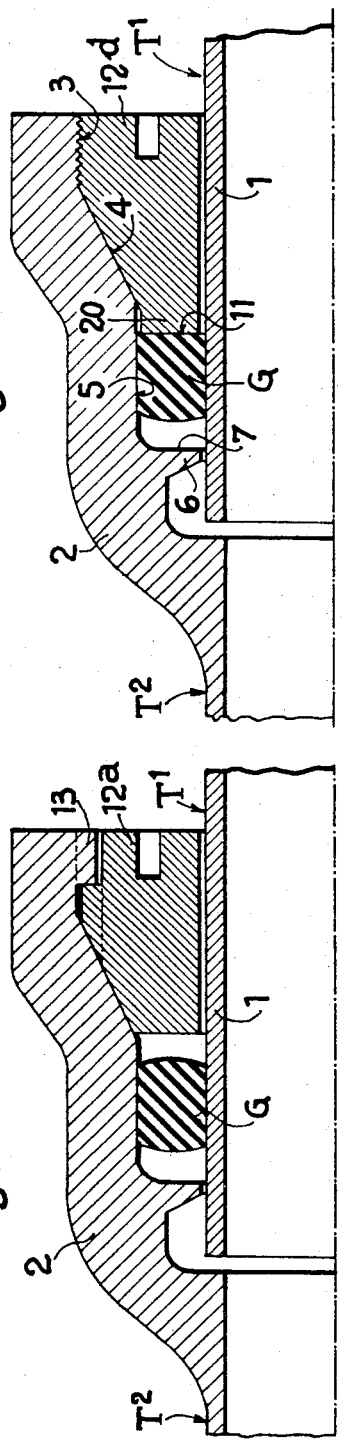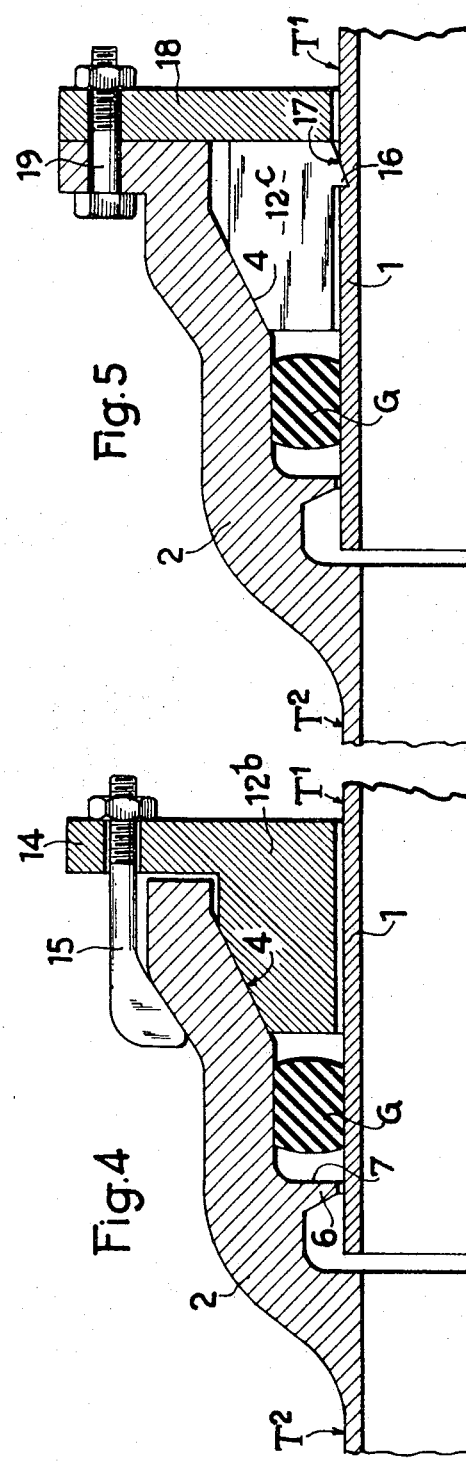

JOINT FOR TUBULAR ELEMENTS

The present invention relates to a joint for pipes and other tubular elements having a socket and a smooth male end, to a method of assembling the joint and to the socket and sealing element forming part of the joint.

Joints are known for pipes having a socket and a male end and including a sealing element which is radially compressed between the face of a recess in the socket and the male end. In this joint, the sealing element has in the free uncompressed state an inside diameter less than the outside diameter of the male end so that when the male end is inserted in the socket, previously provided with the sealing element, it is necessary to exert great force to cause the male end to enter the socket and produce a radial compression of the sealing element by an automatic clamping of said element between the outer face of the male end and the inner face of the recess in the socket. Serious difficulties are met with when assembling this type of joint, in particular when the tubular elements (pipes, couplings or elbows) are composed of a heavy material, for example iron, and have large diameters. It is then indeed difficult to cause the male end to penetrate the socket since this penetration requires considerable force difficult to exert. Further, it is difficult to maintain the tubular elements to be assembled in alignment, particularly in the case of couplings.

An object of the present invention is to overcome these drawbacks and to permit an easy assembly of the male end with the socket irrespective of the dimensions and weights of the pipes, couplings or elbows to be assembled.

The invention provides a method for assembling a joint for tubular elements (pipes, couplings, elbows) one of which has a smooth male end and the other a socket, a sealing element being radially compressed therebetween, comprising first putting the two tubular elements in the correct relative positions while centering the male end in the socket, then placing the sealing element in a recess in the socket while radially compressing the sealing element.

The relative positioning of the two tubular elements is therefore carried out without acting on the sealing element and consequently without exertion of force.

If the pipe or other element having a smooth male end comprises at its other end a socket, the sealing element is first placed in an initial position on the male end after which the latter is inserted in the socket of the other element and finally the sealing element is forced into its final position in the recess of the socket.

In any case, the sealing element is compressed radially by forcing it to slide longitudinally against a frustoconical face which prolongs the face of the recess provided in the socket for the sealing element.

Another object of the invention is to provide a tubular element (pipe, coupling or elbow) having a socket adapted and arranged for carrying out the above-defined method.

The tubular element according to the invention comprises a socket which has at its entrance means for fixing a retaining ring for retaining the sealing element in the socket and, axially adjacent said retaining means, an inwardly convergent frustoconical face in the socket which is axially adjacent a rabbet which constitutes a recess for the sealing element and has an inner end face defined by a transverse flange.

Another object of the invention is to provide a joint between a socket and a male end of two tubular elements assembled by the above-defined method and comprising, with said socket and said male end, a sealing element and a retaining ring for said element, said socket having at its entrance means for fixing said retaining ring, and axially adjacent said fixing means, an inwardly convergent frustoconical face axially adjacent a rabbet which constitutes a recess in which said sealing element is located and radially compressed, said recess having an inner end face defined by a transverse flange which also defines a circular opening for centering the male end and having a diameter slightly greater than the outside diameter of the male end, the retaining ring being of cylindrofrustoconical shape so as to fill the part of the frustoconical face of the recess when the retaining ring is placed axially adjacent said sealing element.

Further features and advantages of the invention will be apparent from the ensuing description with reference to the accompanying drawings.

In the drawings:

FIG. 1 is an axial sectional view of a joint according to the invention before the sealing element is inserted therein;

FIG. 2 is a similar sectional view of the finished joint, and

FIGS. 3 – 6 are half axial sectional views of modifications of joints according to the invention.

In the embodiment shown in FIGS. 1 and 2, the invention is shown to be applied to the fluidtight assembly of a smooth male end 1 of a pipe, pipe section or other tubular element $T^1$ with a socket 2 of another pipe, pipe section or tubular element $T^2$ with interposition of a sealing element G.

The socket 2 has internally and axially adjacent its entrance, an inner screwthread 3 having a diameter $a$. This screw-thread is connected by a first socket portion which has a convergent frustoconical face 4 — having at its outer or entrance end a diameter equal to $a$ and at its inner end a diameter less than $a$ — to a second cylindrical cylindrical socket portion or inner rabbet 5 having a diameter $b$. A flange 6 having an inside diameter $c$ a little greater than the outside diameter $d$ of the male end 1 of the pipe $T^1$ and substantially less than the diameter $b$ defines by its transverse face 7 the inner face of the rabbet 5.

The sealing element G in an uncompressed state has a barrel-shaped radial cross section, that is, it has an inner annular face 8 and an outer annular face 9 which are crowned and defined by two parallel plane faces 10, 11, which are transversely disposed with respect to the axis X—X of the joint. The dimensions of the sealing element are such that when in its uncompressed state its minimum outside diameter is in the neighbourhood of the inside diameter $d$ of the male end 1 and its maximum outside diameter exceeds the diameter $b$ of the rabbet 5 of the socket.

Closing or retaining means are provided at the entrance of the socket. These means comprise a ring 12 having an outer screwthread 13 whose diameter $a$ is such that it can be screwed into the screwthread 3 of the socket 2 of the pipe $T^2$. The ring has a trapezoidal radial cross-sectional shape and an inside diameter $e$ which is slightly greater than the outside diameter $d$ of the male end 1.

To assemble the joint, the ring 12 and then the sealing element G are first engaged on the male end 1 of the pipe $T^1$. These elements easily slide on this male end. The male end is then inserted in the socket 2 of the pipe $T^2$. This insertion is easy and requires no appreciable thrust. The flange 6 centers the pipes $T^1$ and $T^2$. When these pipes have been put in their correct relative positions in the joint (FIG. 1), the sealing element G is forced in the annular recess 5 or rabbet(after this sealing element has previously been coated with a lubricant) by means of some thrust exerting tool which bears against the face 11 of the element and urges it into the socket without rolling the element. The frustoconical face 4 facilitates the progressive radial compression of the element G and its introduction into the rabbet 5. After having withdrawn the tool which had served to insert the sealing element, the screwthreaded portion of the ring 12 is screwed into the screwthreaded portion 3. The entrance of the socket is thus closed and the joint is in its final state as shown in FIG. 2.

Consequently, if the sealing element G is subjected to a very high pressure on the part of the fluid within the pipes, it cannot be expelled from the rabbet 5. The sealing between the two pipes is ensured owing to the radial compression of the sealing element in the space defined by the end face 7 of the flange 6 and the outer face of the smooth male end 1 of the pipe $T^1$.

As can be seen, by means of the invention it is easy to insert the male end 1 in the socket 2 and then place the sealing element G in position by exerting an axial thrust thereon. This is of particular advantage in the case of the laying of pipes of large diameter since, owing to their weight, they are difficult to handle. Now, as the sealing element is placed in position subsequent to the final positioning of the pipes, it does not render the handling of the pipe $T^1$ more difficult.

Further, the joint obtained is of use in the case of the assembling of couplings or short elbows in which it is difficult to maintain the alignment of the parts during the fitting.

The joint is of universal utility, since it is possible to employ it for pipes of large or small diameters or for couplings or elbows.

It is possible to effect modifications in the joint according to the invention. Thus, the retaining ring 12 may be replaced by :

a. a ring 12a (FIG. 3) having bayonet fixing means maintained by inner lugs 13 instead of the screwthreading 13 of the first embodiment, the inside diameter of the lugs being greater than the outside diameter of the sealing element G in the uncompressed state of the latter ;

b. a ring 12b or counter-flange 14 (FIG. 4) which is screwthreaded externally or hooked to the socket 2 by hook members 15 ;

c. a split ring 12c (FIG. 5) which is resiliently yieldable and so shaped that it is tightened around the male end of pipe $T^1$ under the effect of the tapered face 4 and thus hooks through an inner toothed portion 16 into an outer recess 17 formed in the male end 1 of the pipe $T^1$ so that this pipe is locked in position. An annular safety plate 18 can be fixed by bolts 19 to the socket.

Further, it is possible, as shown in FIG. 6, to employ a ring 12d as thrust means for exerting a thrust on the sealing element after the male end 1 of the pipe $T^1$ has been inserted in the socket 2 of the pipe $T^2$. This trapezoidal ring has a cylindrical extension 20 having inside and outside diameters respectively greater than the outside diameter of the male end of the pipe and less than the inside diameter of the rabbet 5 so as to exert a thrust on the face 11 of the sealing element G.

The sealing element described can be replaced by an O-section sealing element but in this case when it is inserted in the rabbet 5 it is subjected to internal deformations and stresses which may impair its performance over a period of time.

Having now described my invention what I claim and desire to secure by Letters Patent is :

1. In a joint comprising a socket having an entrance end and integral with a first pipe section, a male end of a second pipe section coaxial with said socket, a sealing element interposed between said socket and said male end, a retaining ring for retaining said sealing element in axial position in said socket, and means for fixing said ring axially in position in said socket; the following features : said socket has a first inner portion adjacent said entrance end and defining a frustoconical face inwardly convergent to a small end remote from said entrance end, a second inner portion defining a first cylindrical face connected to said small end of said frustoconical face and defining with said male end an annular space, and a third inner portion adjoining said second portion and defining a second cylindrical face having a diameter less than the diameter of said first cylindrical face and slightly greater than the outside diameter of said male end for centering said male end in said socket, said sealing element is located in said annular space and is in engagement with said male end and said first cylindrical face and in a compressed condition radially of said socket and free to expand axially of said socket, and said retaining ring defines an end face which extends radially of said annular space in the region of said connection of said first cylindrical face to said small end of said frustoconical face and acts as an axial abutment for retaining said sealing element in said second portion of said socket.

2. A joint as claimed in claim 1, wherein said frustoconical face has adjacent said entrance end a diameter exceeding the outside diameter of the sealing element in a free uncompressed state of the sealing element and at said connection to said first cylindrical face a diameter less than said outside diameter of the sealing element in said free uncompressed state.

3. A joint as claimed in claim 1, wherein said sealing element is a washer which has in an uncompressed state a barrel-shaped radial cross section, said cross-sectional shape being defined by crowned inner and outer faces and two parallel plane faces transverse to the axis of the washer.

4. A joint as claimed in claim 1, wherein said means for fixing the retaining ring are screwthreaded means.

5. A joint as claimed in claim 1, wherein said means for fixing the retaining ring is a bayonet device.

6. A joint as claimed in claim 1, wherein said means for fixing the retaining ring is a counterflange and means for hooking said counterflange to said socket.

7. A joint as claimed in claim 1, wherein said means for fixing the retaining ring is a split ring having an inner toothed portion which is held in engaged relation to a cavity in said second element by the resilient deformation of said ring produced by said frustoconical face engaged with said split, said cavity constituting stop means preventing extraction of said male end from said socket.

8. A joint as claimed in claim 12, wherein said retaining ring has an outer frustoconical face which is substantially co-extensive with and engages said frustoconical face of said first portion of said socket.

* * * * *